(12) United States Patent
Smethers

(10) Patent No.: US 7,130,894 B2
(45) Date of Patent: Oct. 31, 2006

(54) GRAPHICAL USER INTERFACE FEATURES OF A BROWSER IN A HAND-HELD WIRELESS COMMUNICATION DEVICE

(75) Inventor: Paul A. Smethers, Seattle, WA (US)

(73) Assignee: Openwave Systems Inc., Redwood City, CA (US)

( * ) Notice: Subject to any disclaimer, the term of this patent is extended or adjusted under 35 U.S.C. 154(b) by 207 days.

(21) Appl. No.: 10/703,856

(22) Filed: Nov. 6, 2003

(65) Prior Publication Data

US 2005/0153745 A1    Jul. 14, 2005

Related U.S. Application Data

(62) Division of application No. 09/940,265, filed on Aug. 27, 2001, now abandoned.

(51) Int. Cl.
*G06F 13/00* (2006.01)
(52) U.S. Cl. ...................... 709/219; 719/328
(58) Field of Classification Search ............... 709/217, 709/219; 719/328, 329
See application file for complete search history.

(56) References Cited

U.S. PATENT DOCUMENTS

| | | | |
|---|---|---|---|
| 5,371,779 A | 12/1994 | Kobayashi | |
| 5,633,912 A | 5/1997 | Tsoi | |
| 5,841,849 A | 11/1998 | Macor | |
| 5,930,474 A * | 7/1999 | Dunworth et al. ........ | 709/217 |
| 5,999,827 A | 12/1999 | Sudo et al. | |
| 6,084,951 A | 7/2000 | Smith et al. | |
| 6,091,956 A * | 7/2000 | Hollenberg ............. | 455/456.5 |
| 6,122,520 A * | 9/2000 | Want et al. ............... | 455/456.2 |
| 6,125,287 A | 9/2000 | Cushman et al. | |
| 6,195,569 B1 | 2/2001 | Frederiksen | |
| 6,285,364 B1 | 9/2001 | Giordano, III et al. | |
| 6,332,024 B1 | 12/2001 | Inoue et al. | |
| 6,363,259 B1 | 3/2002 | Larsen | |
| 6,452,544 B1 * | 9/2002 | Hakala et al. ........ | 342/357.13 |
| 6,509,913 B1 | 1/2003 | Martin, Jr. et al. | |
| 6,570,974 B1 | 5/2003 | Gerszberg et al. | |
| 6,591,117 B1 | 7/2003 | Kim | |
| 6,608,637 B1 | 8/2003 | Beaton et al. | |
| 6,629,136 B1 * | 9/2003 | Naidoo ..................... | 709/219 |

(Continued)

OTHER PUBLICATIONS

*Microsoft Computer Dictionary*, Fourth Edition, Microsoft Press, Redmond, Washington, 1999, p. 109.

*Primary Examiner*—Viet D. Vu
(74) *Attorney, Agent, or Firm*—Blakely, Sokoloff, Taylor & Zafman

(57) ABSTRACT

A microbrowser in a mobile telephone or other hand-held mobile device generates a Graphical User Interface (GUI) having features that make the device more user-friendly. In one mode, the GUI includes a softkey indicator indicating a corresponding softkey action and an input field for receiving a user-input character string, such as a telephone number. In response to typing in the input field, a softkey action previously associated with the input field, such as a dial action, is automatically selected, and the softkey indicator is automatically changed to indicate the selected action. In another mode, the GUI displays an input field and a menu listing performable actions. In response to a user input representing a single action by the user and designating one of the performable actions, the designated action is selected and the input field is activated, enabling the user to input characters associated with the designated action.

20 Claims, 5 Drawing Sheets

U.S. PATENT DOCUMENTS

| | | |
|---|---|---|
| 6,650,889 B1 | 11/2003 | Evans et al. |
| 6,691,114 B1 * | 2/2004 | Nakamura ................. 707/10 |
| 6,807,168 B1 | 10/2004 | Daly et al. |
| 2002/0107985 A1 * | 8/2002 | Hwang et al. .............. 709/246 |
| 2002/0135614 A1 * | 9/2002 | Bennett ..................... 345/745 |
| 2003/0159109 A1 * | 8/2003 | Rossmann et al. ......... 715/513 |

* cited by examiner

FIG. 4A  FIG. 4B

GRAPHICAL USER INTERFACE FEATURES OF A BROWSER IN A HAND-HELD WIRELESS COMMUNICATION DEVICE

This is a divisional of U.S. patent application Ser. No. 09/940,265, filed on Aug. 27, 2001 and entitled, "Graphical User Interface Features of a Browser in a Hand-Held Wireless Communication Device, now abandoned."

FIELD OF THE INVENTION

The present invention pertains to wireless communication devices. More particularly, the present invention relates to Graphical User Interface (GUI) features of a microbrowser in a hand-held wireless communication device.

BACKGROUND OF THE INVENTION

For people and businesses requiring instant access to information, the Internet and intranets have provided a vehicle for near real-time delivery of information from an enormous number of sources. For many of those same individuals, mobile devices such as cellular telephones, two-way pagers, and Personal Digital Assistants (PDAs) have provided a way of communicating regardless of locality. In recent years, Internet technology and mobile computing and communications technologies have begun to merge, to the point where mobile devices such as mobile telephones, PDAs, and pagers are now common entry points to the Internet and intranets.

Devices used to access the Internet (or intranets) generally have certain features in common, whether they sit on a desktop or are held in the palm of the hand. One such feature is that they may be used to display and navigate hypermedia content, such as World Wide Web pages. Such devices normally include software known as a browser, which allows the user to access and navigate hyperlinked content. In a mobile device, this software is sometimes referred to as a microbrowser or minibrowser, because the software consumes much less memory than a conventional PC browser, but it is nonetheless simply a particular type of browser and may be referred to as such.

To access the Internet, network servers and network personal computers (PCs) normally use standard web protocols and mark-up languages, such as hypertext transport protocol (HTTP) and hypertext markup language (HTML), respectively. Mobile devices generally use wireless protocols, such as wireless access protocol (WAP) or handheld device transport protocol (HDTP), and wireless markup languages, such as wireless markup language (WML) and handheld device markup language (HDML), to accomplish the same tasks.

One problem with using mobile devices to access the Internet is the lack of user-friendliness of their user interfaces. Because these devices are designed to be mobile, they normally have very small displays, limited memory, compact keypads and, commonly, only a limited provision for pointer/cursor movement. These restrictions exist on mobile devices because the mobile devices are designed to be relatively inexpensive and small so as to fit into the palm of the hand. What is needed, therefore, is a mobile device which provides a more user-friendly interface for accessing the Internet or other remote data networks.

In a mobile (e.g., cellular) telephone, because of the small amount of device memory, it is difficult to fit in memory a browser with code for one user interface for browser functions and another, completely separate set of code for a second user interface for telephony functions (e.g., dialing telephone numbers, accessing the telephone's internal address book, and accessing the telephone's settings). It is also difficult for many users to learn two user interfaces if these user interfaces have different end-user features. Therefore, it is desirable on some mobile telephones to leverage the browser's user interface to implement the telephone's user interface, in order to save memory (only one set of user interface code is needed in the telephone) and to reduce end-user confusion (only one user interface is presented to the user).

SUMMARY OF THE INVENTION

The present invention includes a method and apparatus for operating a hand-held mobile device. In one embodiment of the method, a softkey indicator indicating a corresponding softkey action is displayed on a display of the hand-held mobile device. An input field is also displayed on the display with the softkey indicator, for receiving characters input by a user using an input device of the hand-held mobile device. In response to detecting activation of the input field, a softkey action previously associated with the input field is automatically selected, and the softkey indicator is automatically changed to indicate the selected softkey action.

In another embodiment of the method, an input field and a menu including a number of actions that can be performed using characters input to the input field are displayed on the display. A user input representing a single action by the user and designating one of the actions in the menu is then received. In response to the user input, the designated action is selected and the input field is activated to enable the user to input characters associated with the designated action.

In another embodiment of the method, the hand-held mobile device communicates with a remote processing system over a wireless network and acquires information associated with a current location of the hand-held mobile device. The hand-held mobile device then displays a hyperlink indicating the location of the device to the user on the display, based on the acquired information.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIGS. 4A through 4F show a sequence of display screens generated by the browser of the hand-held mobile device.

DETAILED DESCRIPTION

Figure 1:
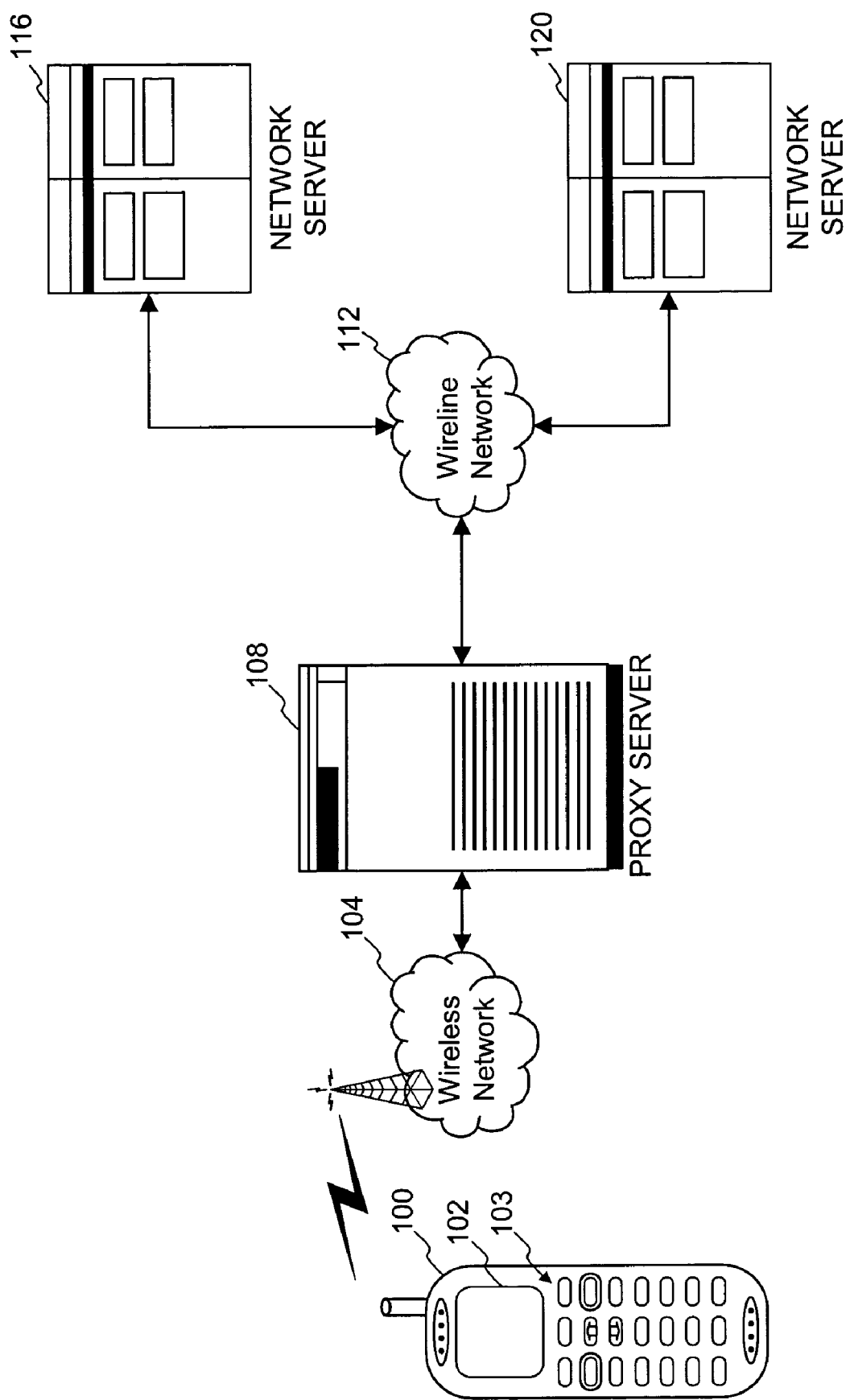
FIG. 1 illustrates a network environment in which a hand-held mobile device may be used.

A method and apparatus for providing a microbrowser with a Graphical User Interface (GUI) in a hand-held, wireless, mobile device are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc. described in one embodiment may also be included in other embodiments. Thus, the present invention can include a variety of combinations and/or integrations of the embodiments described herein.

A microbrowser in a hand-held mobile device can be designed to provide a (Graphical User Interface) GUI that is more user-friendly than those of prior mobile devices, as described below. As used herein, "hand-held" means designed to be held in the palm of the hand. A "wireless" device is a device designed to communicate across a wireless network.

One type of hand-held mobile device is a mobile (e.g., cellular) telephone. A problem with current mobile telephones that include browsers is that, to make a telephone call while the browser is running, the user is required to perform an undesirably long sequence of actions. This problem also occurs when using the browser to implement the mobile telephone's phone user interface for making calls. With a current browser, the user must first select a displayed text box, then type a telephone number into the text box using the telephone's keypad, then use a key to de-select the text box, then select a hyperlink labeled "Call" or "Talk" (or something similar), and finally, activate the hyperlink to initiate the call. This sequence of actions is tedious for many users and, in any event, is undesirably longer and more complicated than placing a telephone call on a telephone that has no browser or in which the browser is not running as the telephone's user interface. It is desirable, therefore, to simplify making a telephone call from the context of an active browser, so that it is more like making a telephone call from a more conventional or non-browser-enabled telephone.

Accordingly, as described in greater detail below, the browser of the present invention provides a mode which facilitates making a telephone call, in a manner which is much easier for the user than in prior browsers. Specifically, the browser provides a GUI that includes a softkey indicator indicating a corresponding softkey action and an input field for receiving a user-input character string, such as a telephone number. In response to activation of (e.g., typing a number into) the input field, a softkey action previously associated with the input field, such as a dial action, is automatically selected, and the softkey indicator is automatically changed to indicate the selected action. This allows the user to initiate the call simply by typing the telephone number and then activating the softkey.

In another mode, the GUI displays an input field and a menu listing performable actions. In response to a user input representing a single action by the user and designating one of the performable actions, the designated action is selected and the input field is activated, enabling the user to input characters associated with the designated action. This allows easier selection from among multiple menu items along with associated text entry.

Another problem to be addressed herein is that, when the user of a mobile device is traveling, there may be instances when the user is lost or is unsure about his current location. Sometimes the user may need information that is particularly relevant to the user's current location, such as the locations of nearby gas stations, restaurants, stores, automatic teller machines (ATMs), or points of interest. Accordingly, the browser of the present invention provides an efficient way of indicating the user's current location and of enabling the user to quickly and easily access information and location-dependent services that are relevant to that location. Other advantageous features of the browser will be apparent from the description which follows.

FIG. 1 shows a network environment in which a mobile, hand-held communication device (or simply "mobile device") can be used. Mobile device 100 may be of any of the types of mobile devices mentioned above, such as a mobile (e.g., cellular) telephone, PDA, or two-way pager, for example. To facilitate explanation, the example of a mobile telephone is used at various points in the following description. Mobile device 100 is configured to retrieve remotely stored hypermedia information, such as WML card decks, HTML documents, compact HTML (cHTML) documents, extensible markup language (XML) documents, or HDML documents, from one or more network server device, shown as network servers 116 and 120. Network Servers 116 and 120 may be, for example, conventional personal computers (PCs), server-class computers, or computer workstations. Mobile device 100 has a display 102 and a keypad 103.

Mobile device 100 also includes and executes a microbrowser, which is software that allows the user of mobile device 100 to access and navigate content on the Internet or other network, including browsing the World Wide Web or any other "web" of hypermedia content. One example of a microbrowser that may be used for this purpose is the UP.Browser from Openwave Systems Inc. of Redwood City, Calif. The microbrowser may be stored in memory within the mobile device 100. The microbrowser generates a GUI via display 102 to enable the user of the mobile device 100 to access and retrieve hypermedia information from network servers 116 and 120. Various features of the GUI which make the microbrowser more user-friendly are described below.

The communication path between mobile device 100 and network servers 116 and 120 includes a wireless communication network 104, a proxy server 108, and a wireline network 112. The wireless network 104 is a wireless telecommunications network such as a cellular digital packet data (CDPD) network, a global system for mobile (GSM) network, a code division multiple access (CDMA) network, or a time division multiple access (TDMA) network. The communications protocols used by wireless network 104 may include, for example, WAP and/or HDTP. The wireline network 112 is a land-based network that may be or include the Internet, an intranet, or a data network of any private network, such as a local area network (LAN). The communication protocol supporting wireline network 112 may be, for example, transmission control protocol/Internet protocol (TCP/IP), HTTP, or secure HTTP (sHTTP).

Proxy server 108 acts a bridge between wireless network 104 and wireline network 112. Proxy server 108 may be, for example, a conventional server-class computer or PC. Although shown as a physically separate device, proxy server 108 may be implemented in a network server (e.g. network servers 116 or 120) with hardware and software well known in the art providing the connection between wireless network 104 and wireline network 112. Proxy server 108 may also provide gateway functions, such as translation/conversion between the language(s) and protocol(s) used on the wireless network 104 and those used on the wireline network 112.

Figure 2:
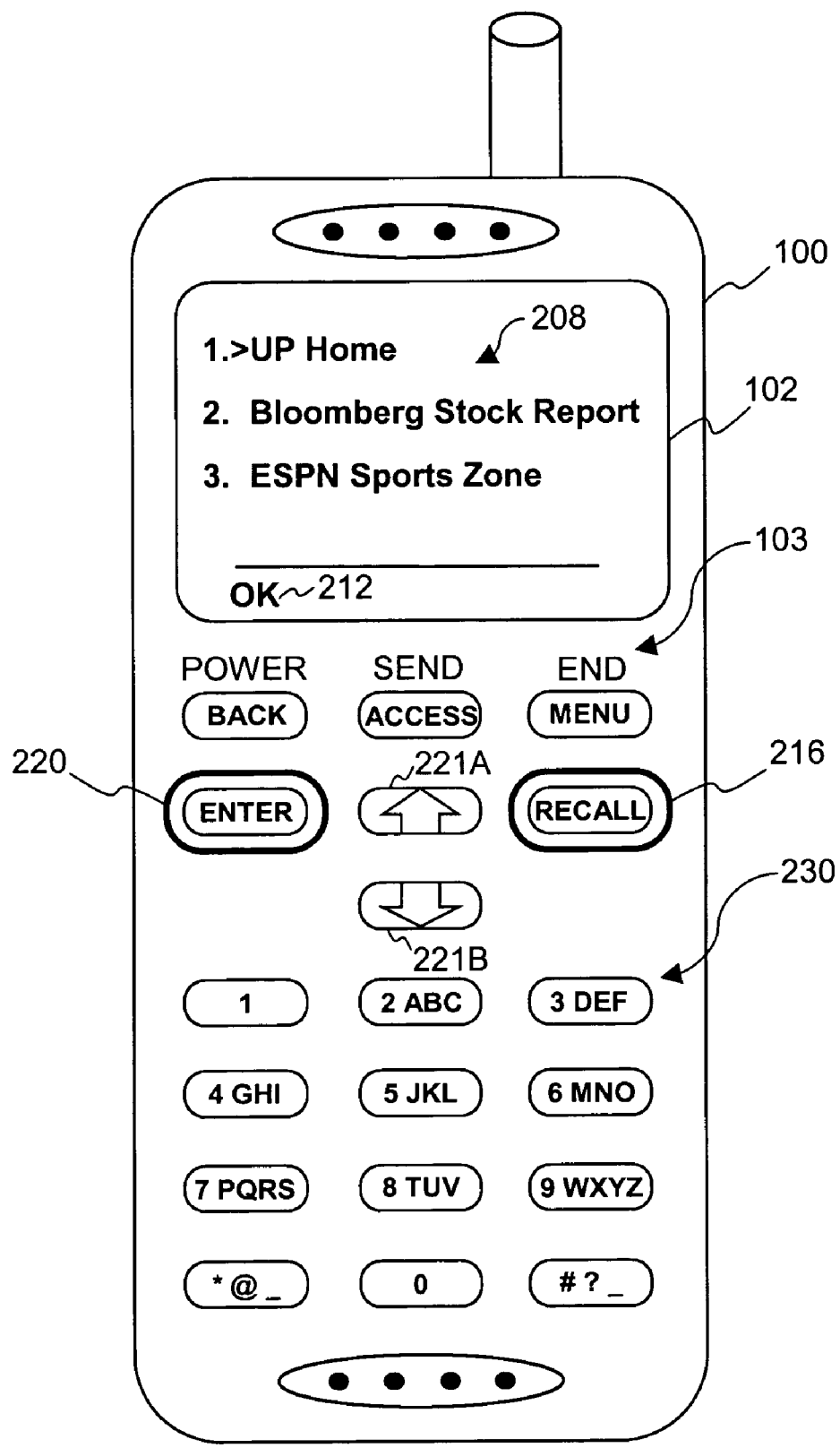
FIG. 2 is a schematic view of a hand-held mobile device that may be used to access the Internet.

FIG. 2 is a schematic view of the mobile device 100, according to one embodiment. As shown, mobile device 100 includes a display 102 and a keypad 103. Display 102 may display hypermedia information, such as information 208, and, depending on the current mode of the device, one or more softkey indicators, such as softkey indicator 212. Function keys 216 and 220 can be used to activate softkeys represented by the softkey indicators (when enabled). It is useful to now define what is meant by a "softkey". A softkey is a user-operable feature that is analogous to a physical key or button, but which is formed by a combination of a physical key (e.g., either of keys 220 and 216 in FIG. 2) and a softkey indicator displayed on the display 102. Because not all features can be easily mapped to specific keys on small, wireless devices, the use of softkeys has become commonplace for manipulating items on the screen and initiating functions. Such devices typically have no direct input mechanisms (e.g., pen-based input or mouse input (such as on a PDA or PC respectively). To compensate, softkeys are indicated by indicators displayed directly above the physical keys that operate the softkey functions. To facilitate description, softkey indicators may be referred to herein simply as "softkeys". It will be understood, however, that "pressing" or otherwise activating a softkey is accomplished by pressing the physical key which corresponds to the softkey indicator.

Referring still to FIG. 2, keypad 103 includes alphanumerical keys 230 (such as for dialing a telephone numbers and entering links), function keys 216 and 220, Up arrow key 221A, and Down arrow key 221B. Arrow keys 221A and 221B are used to navigate through information displayed on display 208, such as to move a selection indicator (e.g., highlighting), cursor, pointer, or other indicator, or to scroll the display.

The hypermedia information 208 shown in FIG. 2 includes a list of selectable identifiers (e.g. "UP Home") having corresponding Uniform Resource Identifiers (URIs). Hypermedia information 208 may be generated from a WML file or "deck", for example, including one or more WML cards. In certain modes of operation, activating function key 220 while a displayed item is selected (e.g., highlighted) causes mobile device 100 to retrieve and display a WML card associated with a URL of that item. In addition, using the alphanumerical keys 230, the user may enter a URL manually to access hypermedia content. To facilitate this operation, the microbrowser may provide several different input modes, such as a number input mode, an alphabetic input mode, a symbol input mode, and a URL input mode.

Figure 3:
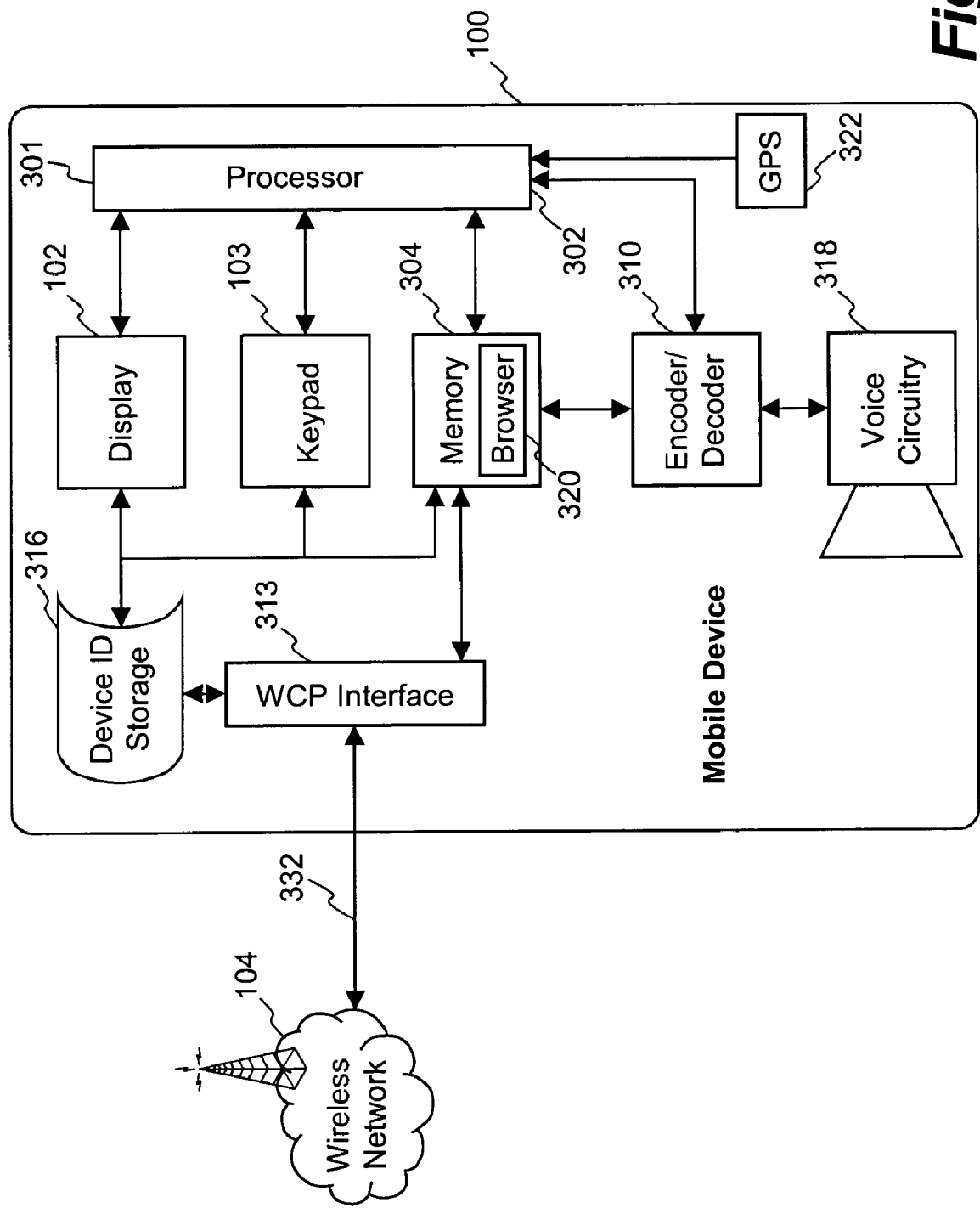
FIG. 3 is a block diagram of the principle components of the hand-held mobile device.

FIG. 3 is a block diagram showing the principle components of mobile device 100, according to one embodiment. The mobile device 100 includes a processor 301, which may be, or may include, any of: a general-purpose or special-purpose programmable microprocessor, digital signal processor (DSP), microcontroller, application specific integrated circuit (ASIC), programmable logic array (PLA), field programmable gate array (FPGA), etc., or any combination thereof. Mobile device 100 includes a Wireless Control Protocol (WCP) interface 313 that couples to a carrier network via wireless network 104 to receive incoming and outgoing signals. Device identifier (ID) storage 316 stores and supplies to WCP interface 313 a device ID which identifies mobile device 100 to outside entities (e.g. proxy server 108). The device ID is a specific code that is associated with mobile device 100 and directly corresponds to the device ID in the user account typically provided in an associated proxy server device, such as proxy server 108.

In addition, mobile device 100 includes memory 304 that stores data and/or software for performing many of the processing tasks performed by mobile device 100, including the microbrowser (or "browser") 320, when executed by processor 301. These tasks include: establishing a communication session with a proxy server device via wireless network 104; receiving user inputs from keypad 103; requesting and receiving data from the wireless network 104; and displaying information on the display 102. Hence, memory 304 may represent one or more physical memory devices, which may include any type of random access memory (RAM), read-only memory (ROM) (which may be programmable), flash memory, non-volatile mass storage device, or a combination of such memory devices. Memory 304 is also coupled to WCP interface 313 for the establishment of a communication session and the requesting and receiving of data.

The mobile device 100 also includes voice circuitry 318 for inputting and outputting sound during a telephonic communication between the user of mobile device 100 and a remote party. Voice circuitry 318 includes circuitry to process telephony signals and may include, for example, sound transducers, analog-to-digital (A/D) and digital-to-analog (D/A) converters, filters, etc., such as are well-known in the art. An encoder/decoder 310 is coupled between the processor 301 and the voice circuitry 318 for encoding and decoding audio signals.

The mobile device also may include a conventional global positioning system (GPS) location device 322 or another, similar type location device, which precisely determines the geographic location (latitude and longitude) of the mobile device 100. As described further below, the location of the mobile device 100 may be used to provide an indication of the location to the user and/or to provide location-dependent information or services for the user. Alternatively, the location of the mobile device 100 may be determined by a device or system external to the mobile device 100, such as a remote location server on the wireless network 104.

What follows is a description of certain features of the GUI generated by the microbrowser (hereinafter "browser") 320 of the mobile device 100, which may be implemented in a given embodiment, to make the mobile device 100 more user-friendly. It will be readily apparent to those skilled in the art how to implement these GUI features in program code, from the following description of the user-perceivable characteristics of these features. A browser that incorporates these features may be implemented in any programming language that is currently used to write browsers for mobile devices. Note that as an alternative to the browser 320 generating the following GUI features, these features can instead be provided by a remote device (e.g. proxy server 108 or servers 116 or 120), such that the mobile device only receives and displays these features to the user.

Figure 4C:
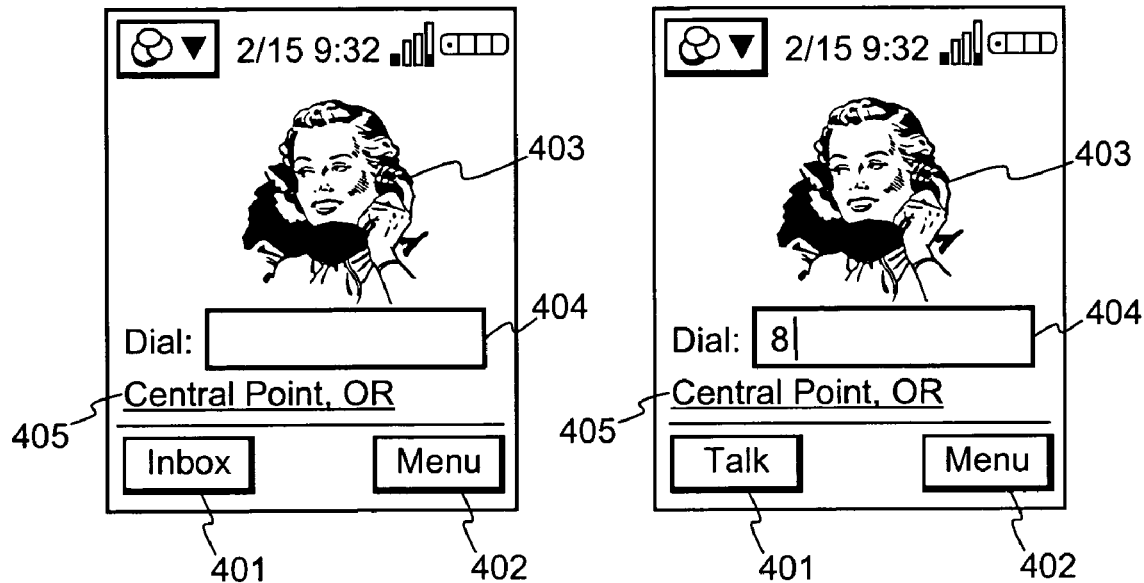
Figure 4C:
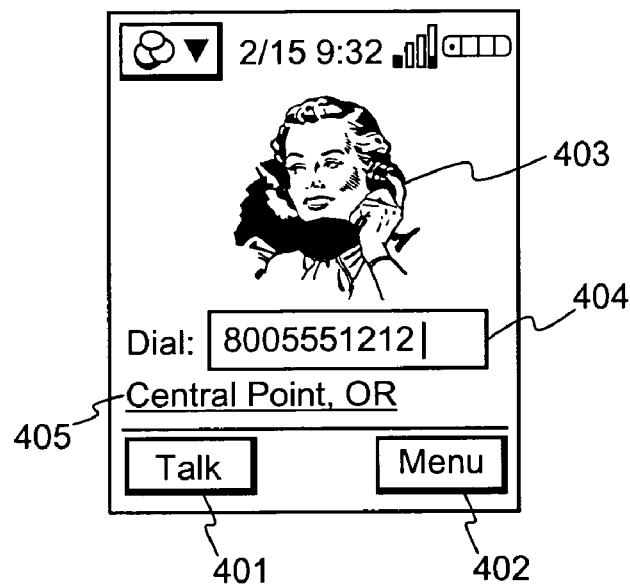

FIGS. 4A through 4F show a sequence of display screens generated by the browser 320 of mobile device 100. The sequence illustrates a GUI feature which simplifies initiating a telephone call while in the context of the browser 320, i.e., while the browser 320 is active and displayed to the user. As will be described, to make the call, the user simply inputs a telephone number and either presses the "Talk" softkey or a physical "Send" key. FIG. 4A shows the idle screen of the GUI generated by the browser 320. The idle screen is the display screen which initially appears when the browser 320 is started and when the browser 320 is running but not being used. As shown, the idle screen includes a primary softkey indicator 401, a secondary softkey indicator 402, a customizable image 403, a "Dial" input field 404, and a location-dependent hyperlink 405. The primary softkey indicator 401 is labeled "Inbox" in the idle screen, which allows the user to access his inbox of voicemail and/or e-mail directly from the idle screen simply by activating the primary softkey. The secondary softkey indicator 402 is labeled "Menu", which allows the user to access a menu, such as a menu of browser functions or other phone user interface functions (e.g., an address book or settings screens). The image 403 may be, for example, a logo of the wireless carrier or a photo or other image provided by the user. The "Dial" input field 404 is used to enter a telephone number of a party to be called. The hyperlink 405 is used to access location-dependent information and services, as described below.

As shown in FIG. 4A, the "Dial" input field 404 is selected by default in the idle screen, as indicated by the bold highlighting around that field. The user begins dialing by typing any numbers on the keypad 103 of mobile device 100. The first number typed will automatically activate the "Dial" input field 404. In the example of FIG. 4B, the user has pressed the first digit ("8"), such that the "Dial" input field 404 becomes activated (a blinking cursor appears to indicate this) and the digit is inserted automatically. In addition, the first digit causes the primary softkey indicator 401 to change from "Inbox" to "Talk" to indicate the change in the corresponding softkey function. Referring to FIG. 4C, the user has completed inputting the telephone number and can now activate the primary softkey ("Talk") or the hard "Send" key to make the telephone call. Thus, making a telephone call from the context of the active browser is much simpler than in prior browser-enabled mobile telephones: the user simply inputs the telephone number and either presses the "Talk" softkey or the hard "Send" key.

The hyperlink 405 is used to access information or services relevant to the location of the mobile device 100. In the illustrated embodiment, hyperlink 405 (hereinafter "city link" 405) indicates the name of the city in which the mobile device 100 is currently located; another embodiment, it may refer to another type of geographic area in which the mobile device 100 is located or nearby, or a nearby point of interest. The location of the mobile device 100 may be determined by the GPS device 322 within mobile device 100, or it may be determined by a remote location server or other similar device and then transmitted to the mobile device 100 over the wireless network 104. Note that the specific manner in which the location of the mobile device is determined is not important for purposes of understanding the feature now being described; any of various conventional techniques may be used.

In one embodiment, the location of the mobile device 100, once determined, is used by the browser to select one of multiple hyperlinks previously stored within the mobile device, each corresponding to the different geographic region. These hyperlinks may have been stored in the mobile device 100 by the manufacturer, or they may have been previously provisioned in the mobile device 100. The selected hyperlink is then displayed as city link 405. In another embodiment, the location of the mobile device 100 is used by the browser to request, via the wireless network 104, a hyperlink for accessing information or services relevant to the location of the mobile device 100. The location-dependent information or services may be accessed by the mobile device remotely via the wireless network 104. In yet another embodiment, the location of the mobile device is determined by a remote server and used to push the hyperlinks or the location-dependent information or services to the mobile device 100 via the wireless network 104. Alternatively, some or all of the location-dependent information or services may have been previously provisioned in the mobile device 100.

Figure 4D:
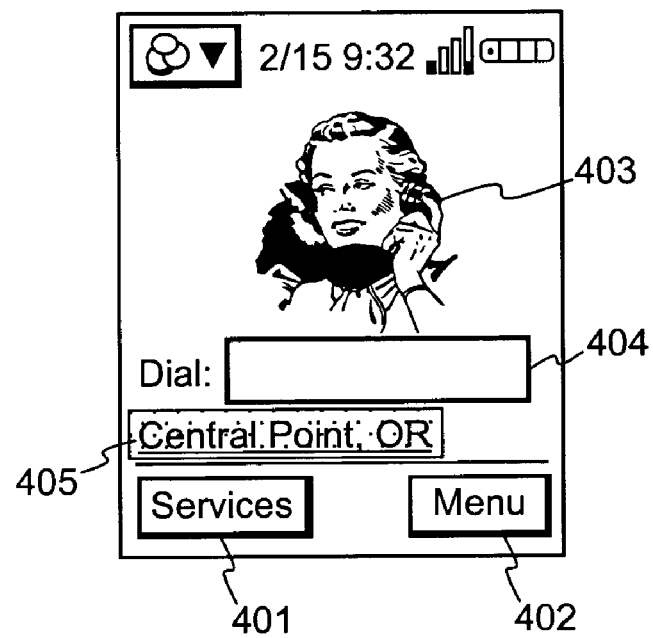
Figure 4E:
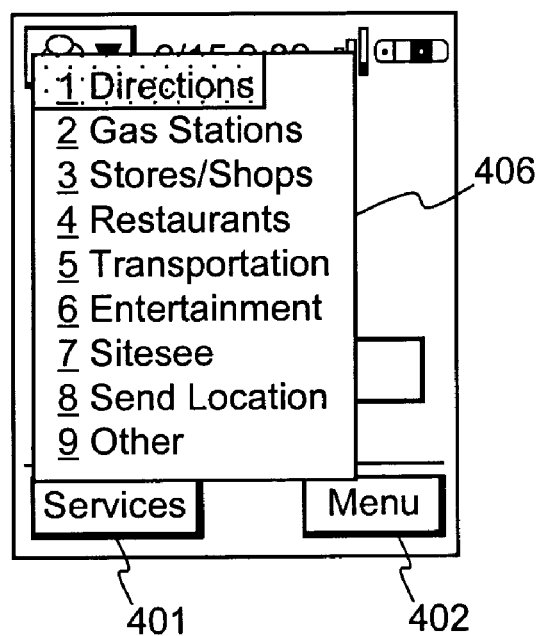
Figure 4F:
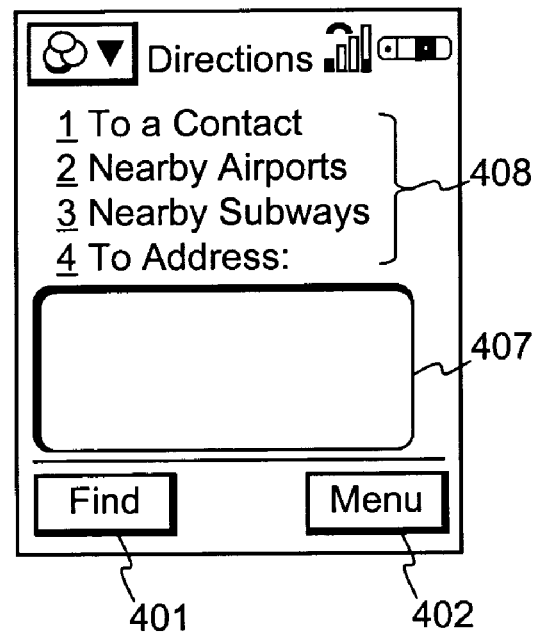

FIGS. 4D through 4F illustrate the operation of city link 105 and other related actions, according to one embodiment. From the idle screen shown in FIG. 4A, the user may scroll down by pressing the down arrow key 221B (FIG. 2) once to select city link 405. City link 405 thus becomes highlighted and the primary softkey label changes to "Services", as shown in FIG. 4D. The user can now select the city link 405 to cause the browser 320 to access remote location-based information or services, which may be (but do not have to be) provided by the wireless carrier. To do this, the user presses the primary softkey while the primary softkey indicator is labeled "Services". The result of this action is shown in FIG. 4E, where the user sees a pop-up menu 406 listing the services and information that are available for the current location. In one embodiment, the wireless carrier has previously provisioned the pop-up menu 406 in the mobile device 100.

The first menu item, "Directions", is highlighted by default and allows the user to request directions using a conventional route-finding service. FIG. 4F shows the display screen that appears when the user selects the "Directions" item. The display screen includes a menu 408 of different types of destinations, to which the user may request directions from the current location. As shown, the user may request directions to a particular contact (e.g., person), nearby airports, nearby subways, or a specific address.

The following described feature enables easier selection from among multiple menu items than is possible with current browsers. Note that a numeral appears to the left of each item in pop-up menu 406 in FIG. 4E and to the left of each item in menu 408 of FIG. 4F. For example, to the left of "Directions" in menu 406 is the numeral "1"; to the left of the "Gas Stations" is the numeral "2"; and so on. When viewing pop-up menu 406 or menu 408, the user can select any of the displayed choices simply by typing the number of the user's choice on the keypad 103. In response to such action, the indicated choice is automatically selected by the browser. Referring to FIG. 4F, when a number corresponding to an item in menu 408 is pressed on the keypad 103, text input field 407 is also automatically activated to allow the user to input a destination of the selected type. This feature, therefore, enables easier selection from among multiple menu items than is possible with current browsers.

Thus, a method and apparatus for providing a microbrowser with a Graphical User Interface (GUI) in a hand-held mobile device have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of operating a hand-held mobile device, the method comprising:
communicating with a remote processing system over a wireless network;
acquiring information associated with a current location of the hand-held mobile device;
displaying a hyperlink on a display of the hand-held mobile device based on the acquired information, the hyperlink indicating a location of the hand-held mobile device to a user of the hand-held mobile device;
receiving a user input activating the hyperlink; and
in response to the user input, accessing and displaying on the display a plurality of menu items, wherein each of the menu items is associated with content of a different type, specific to the location of the hand-held mobile device.

2. A method as recited in claim 1, wherein the hyperlink, as displayed, comprises a name of a geographic location or area.

3. A method as recited in claim 1, wherein the hyperlink, as displayed, comprises a name of a point of interest.

4. A method as recited in claim 1, wherein said acquiring information associated with a current location of the hand-held mobile device comprises receiving the information from a location device within the hand-held mobile device.

5. A method as recited in claim 1, wherein said acquiring information associated with a current location of the hand-held mobile device comprises receiving the information from the remote processing system over the wireless network.

6. A machine readable program storage medium having stored therein a browser usable by a hand-held mobile device, the browser enabling a user of the hand-held mobile device to navigate hyperlinked content on a data network, wherein the browser, when executed on the hand-held mobile device, performs a method comprising:
   communicating with a remote processing system over a wireless network;
   acquiring information associated with a current location of the hand-held mobile device;
   displaying a hyperlink on a display of the hand-held mobile device based on the acquired information, the hyperlink indicating a location of the hand-held mobile device to a user of the hand-held mobile device;
   receiving a user input activating the hyperlink; and
   in response to the user input, accessing and displaying on the display a plurality of menu items, wherein each of the menu items is associated with content of a different type, specific to the location of the hand-held mobile device.

7. A machine readable program storage medium as recited in claim 6, wherein the hyperlink, as displayed, comprises a name of a geographic location or area.

8. A machine readable program storage medium as recited in claim 6, wherein the hyperlink, as displayed, comprises a name of a point of interest.

9. A machine readable program storage medium as recited in claim 6, wherein said acquiring information associated with a current location of the hand-held mobile device comprises receiving the information associated with a current location of the hand-held mobile device from a location device within the hand-held mobile device.

10. A machine readable program storage medium as recited in claim 6, wherein said acquiring information associated with a current location of the hand-held mobile device comprises receiving the information associated with a current location of the hand-held mobile device from the remote processing system over the wireless network.

11. A hand-held mobile device comprising:
   means for communicating with a remote processing system over a wireless network;
   means for acquiring information associated with a current location of the hand-held mobile device;
   means for displaying a hyperlink on a display of the hand-held mobile device based on the acquired information, the hyperlink indicating a location of the hand-held mobile device to a user of the hand-held mobile device;
   means for receiving a user input activating the hyperlink; and
   means for accessing and displaying on the display, in response to the user input, a plurality of menu items, wherein each of the menu items is associated with content of a different type, specific to the location of the hand-held mobile device.

12. A hand-held mobile device as recited in claim 11, wherein the hyperlink, as displayed, comprises a name of a geographic location or area.

13. A hand-held mobile device as recited in claim 11, wherein the hyperlink, as displayed, comprises a name of a point of interest.

14. A hand-held mobile device as recited in claim 11, wherein said means for acquiring information associated with a current location of the hand-held mobile device comprises a location device within the hand-held mobile device.

15. A hand-held mobile device as recited in claim 11, wherein said means for acquiring information associated with a current location of the hand-held mobile device comprises means for receiving the information associated with a current location of the hand-held mobile device from the remote processing system over the wireless network.

16. A mobile telephone comprising:
   a processor;
   a display;
   voice circuitry to process telephony signals;
   an input device; and
   a storage device storing a browser which, when executed by the processor, performs a process which includes
      enabling a user of the mobile telephone to navigate hypermedia content;
      acquiring information associated with a current location of the mobile telephone;
      displaying a hyperlink on a display of the mobile telephone based on the acquired information, the hyperlink indicating a location of the mobile telephone to the user;
      receiving a user input activating the hyperlink; and
      accessing and displaying on the display, in response to the user input, a plurality of menu items, wherein each of the menu items is associated with content of a different type, specific to the location of the hand-held mobile telephone.

17. A mobile telephone as recited in claim 16, wherein the hyperlink, as displayed, comprises a name of a geographic location or area.

18. A mobile telephone as recited in claim 16, wherein the hyperlink, as displayed, comprises a name of a point of interest.

19. A mobile telephone as recited in claim 16, further comprising a location device, wherein said acquiring information associated with a current location of the mobile telephone comprises receiving the information from the location device.

20. A mobile telephone as recited in claim 16, wherein said acquiring information associated with a current location of the mobile telephone comprises receiving the information from a remote server over a wireless network.

* * * * *